United States Patent
Park et al.

(10) Patent No.: US 12,248,864 B2
(45) Date of Patent: Mar. 11, 2025

(54) METHOD OF TRAINING ARTIFICIAL NEURAL NETWORK AND METHOD OF EVALUATING PRONUNCIATION USING THE METHOD

(71) Applicant: MINDS LAB INC., Daejeon (KR)

(72) Inventors: Seung Won Park, Gyeonggi-do (KR); Jong Mi Lee, Gyeonggi-do (KR); Kang Wook Kim, Seoul (KR)

(73) Assignee: MINDS LAB INC., Daejeon (KR)

( * ) Notice: Subject to any disclaimer, the term of this patent is extended or adjusted under 35 U.S.C. 154(b) by 765 days.

(21) Appl. No.: 17/500,645

(22) Filed: Oct. 13, 2021

(65) Prior Publication Data

US 2022/0172025 A1    Jun. 2, 2022

Related U.S. Application Data

(63) Continuation of application No. PCT/KR2021/010130, filed on Aug. 3, 2021.

(30) Foreign Application Priority Data

Nov. 30, 2020    (KR) .................. 10-2020-0165065

(51) Int. Cl.
     *G06N 3/045*          (2023.01)
(52) U.S. Cl.
     CPC .................. *G06N 3/045* (2023.01)
(58) Field of Classification Search
     CPC .................................................. G06N 3/045
     USPC ......................................................... 706/26
     See application file for complete search history.

(56) References Cited

U.S. PATENT DOCUMENTS

| | | | |
|---|---|---|---|
| 10,204,307 B1* | 2/2019 | Dasgupta | G06N 20/00 |
| 10,311,872 B2 | 6/2019 | Howard et al. | |
| 11,948,074 B2* | 4/2024 | Jung | G06N 3/04 |
| 2015/0186359 A1* | 7/2015 | Fructuoso | G10L 25/30 704/8 |
| 2019/0266141 A1* | 8/2019 | Coroiu | G06F 16/953 |
| 2020/0020327 A1 | 1/2020 | Chae et al. | |
| 2020/0082807 A1* | 3/2020 | Kim | G10L 13/047 |
| 2020/0160869 A1* | 5/2020 | Heigold | G10L 17/04 |
| 2020/0302246 A1* | 9/2020 | Shen | G06F 18/2178 |
| 2020/0342852 A1* | 10/2020 | Kim | G06F 40/40 |
| 2020/0380293 A1* | 12/2020 | Finnie | G06F 18/211 |
| 2020/0380359 A1* | 12/2020 | Finnie | G06F 18/24 |
| 2021/0406601 A1* | 12/2021 | Narlikar | G06F 18/213 |
| 2022/0107858 A1* | 4/2022 | Jain | G06F 11/0751 |
| 2022/0131900 A1* | 4/2022 | Karin | G06N 20/00 |

(Continued)

FOREIGN PATENT DOCUMENTS

| KR | 1020190085879 A | 7/2019 |
|---|---|---|
| KR | 1020190085882 A | 7/2019 |
| KR | 1020200023456 A | 3/2020 |

OTHER PUBLICATIONS

International Search Report for corresponding International Application No. PCT/KR2021/010130, mailed Nov. 5, 2021, 6 pages.

*Primary Examiner* — Reza Nabi
(74) *Attorney, Agent, or Firm* — Guntin & Gust, PLC; Miyoung Shin

(57) ABSTRACT

The disclosure relates to a method of training an artificial neural network so that a first artificial neural network is trained based on a plurality of training data including a first feature and a second feature that has a correlation with the first feature and depends on the first feature.

7 Claims, 7 Drawing Sheets

(56) References Cited

U.S. PATENT DOCUMENTS

| | | | |
|---|---|---|---|
| 2022/0172025 A1* | 6/2022 | Park | G06N 3/045 |
| 2022/0342022 A1* | 10/2022 | O'Brien | G06V 10/82 |
| 2023/0169778 A1* | 6/2023 | Hasberg | G06N 3/084 |
| | | | 382/156 |
| 2024/0142573 A1* | 5/2024 | Hakobyan | G01S 7/417 |

* cited by examiner

| Training_Input_Data | Training_Output_Data_3 (Feature 1) | | Training_Output_Data_2 (Feature 2) | | |
|---|---|---|---|---|---|
| | KOREAN | ENGLISH | FIRST SPEAKER | SECOND SPEAKER | THIRD SPEAKER |
| Audio_Data_1 | O | | O | | |
| Audio_Data_2 | | O | | O | |
| Audio_Data_3 | | O | | | O |

METHOD OF TRAINING ARTIFICIAL NEURAL NETWORK AND METHOD OF EVALUATING PRONUNCIATION USING THE METHOD

CROSS-REFERENCE TO RELATED APPLICATION

This application is a continuation of International Application No. PCT/KR2021/010130, filed Aug. 3, 2021, which is based on and claims priority under 35 U.S.C. § 119 to Korean Patent Application No. 10-2020-0165065, filed on Nov. 30, 2020, in the Korean Intellectual Property Office, the disclosure of which are incorporated by reference herein in their entirety.

TECHNICAL FIELD

The disclosure relates to a method of training an artificial neural network so that a first artificial neural network is trained based on a plurality of training data including a first feature and a second feature that has a correlation with the first feature and depends on the first feature.

Also, the disclosure relates to a method of evaluating a pronunciation of a user by using the method of training an artificial neural network.

BACKGROUND

An artificial neural network is trained to output an intended feature based on training data. For example, when an artificial neural network is trained to recognize a type of an uttered language of a user, the artificial neural network may be trained based on voice data labeled with the type of the language.

Such training data inevitably has not only a language feature but also a speaker feature having a correlation with the language feature. For example, referring to training data illustrated in FIG. 8, as a speaker feature is changed for each training data, a language feature may also be changed.

Accordingly, when an artificial neural network is trained based on training data in which two features depend on each other, there is a possibility that the artificial neural network may output a wrong result by additionally learning a speaker feature, in addition to an intended feature, that is, a language feature. For example, an error in which an artificial neural network estimates a type of a language by depending on a speaker feature may occur.

DESCRIPTION OF EMBODIMENTS

To solve the above problems, an objective of the disclosure is to train an artificial neural network by focusing only on a target feature, when a plurality of features depending on one another are included in input data.

Also, an objective of the disclosure is to enable an artificial neural network trained based on training data including both a speaker feature and a language feature to depend only on the language feature.

Also, an objective of the disclosure is to provide, by using an artificial neural network depending only on a language feature, an indicator for evaluating a pronunciation of a corresponding language.

A method of training an artificial neural network so that a first artificial neural network trained based on a plurality of training data including a first feature and a second feature that has a correlation with the first feature depends on the first feature according to an embodiment of the disclosure includes: generating first output data corresponding to first training input data, by using the first artificial neural network, wherein the first artificial neural network is a neural network trained to generate output data corresponding to the first feature from input data; generating third output data corresponding to the first output data and second training output data, by using a second artificial neural network, wherein the second artificial neural network is a neural network trained to output a result of comparison between the first output data and the second training output data, and the second training output data is data including the second feature of the first training input data; generating at least one weight correction value for training the first artificial neural network based on the third output data; and applying the at least one weight correction value to the first artificial neural network.

After the generating of the first output data, the method may further include generating fourth output data corresponding to the first output data and third training output data, by using a third artificial neural network, wherein the third artificial neural network is a neural network trained to output a result of comparison between the first output data and the third training output data, and the third training output data is data including the first feature of the first training input data.

Each of the plurality of training data may include the first training input data, third training output data including the first feature of the first training input data, and the second training output data including the second feature of the first training input data.

First training data from among the plurality of training data may include uttered voice data of a first language of a first speaker as the first training input data, data including a feature of the first language as the third training output data, and data including a feature of the first speaker as the second training output data.

Also, second training data from among the plurality of training data may include uttered voice data of a second language of a second speaker as the first training input data, data including a feature of the second language as the third training output data, and data including a feature of the second speaker as the second training output data.

The generating of the first output data may include outputting the first output data from the uttered voice data of the first language of the first speaker, the generating of the third output data may include generating the third output data that is a result of comparison between the first output data and the second training output data including the feature of the first speaker, and the generating of the at least one weight correction value may include, by referring to the third output data, generating the at least one weight correction value for reducing the feature of the first speaker from the first output data.

The generating of the first output data may include generating the first output data from the uttered voice data of the second language of the second speaker, the generating of the third output data may include generating the third output data that is a result of comparison between the first output data and the second training output data including the feature of the second speaker, and the generating of the at least one weight correction value may include, by referring to the third output data, generating the at least one weight correction value for reducing the feature of the second speaker from the first output data.

After the generating of the first output data, the method may further include generating the first output data depending on a feature of a first language, from input data including uttered voice data of the first language of a third speaker, by using the first artificial neural network.

According to the disclosure, when a plurality of features depending on one another are included in input data, an artificial neural network may be trained by focusing on a target feature.

In particular, according to the disclosure, an artificial neural network trained based on training data including both a speaker feature and a language feature may depend only on the language feature.

Also, by using an artificial neural network depending only on a language feature, an indicator for evaluating a pronunciation of a corresponding language may be provided.

BRIEF DESCRIPTION OF DRAWINGS

FIG. 3 illustrates a diagram for describing a structure of an artificial neural network trained by the apparatus of the disclosure; and FIG. 4 illustrates another diagram for describing the structure of the artificial neural network trained by the apparatus of the disclosure.

DETAILED DESCRIPTION

Figure 1:
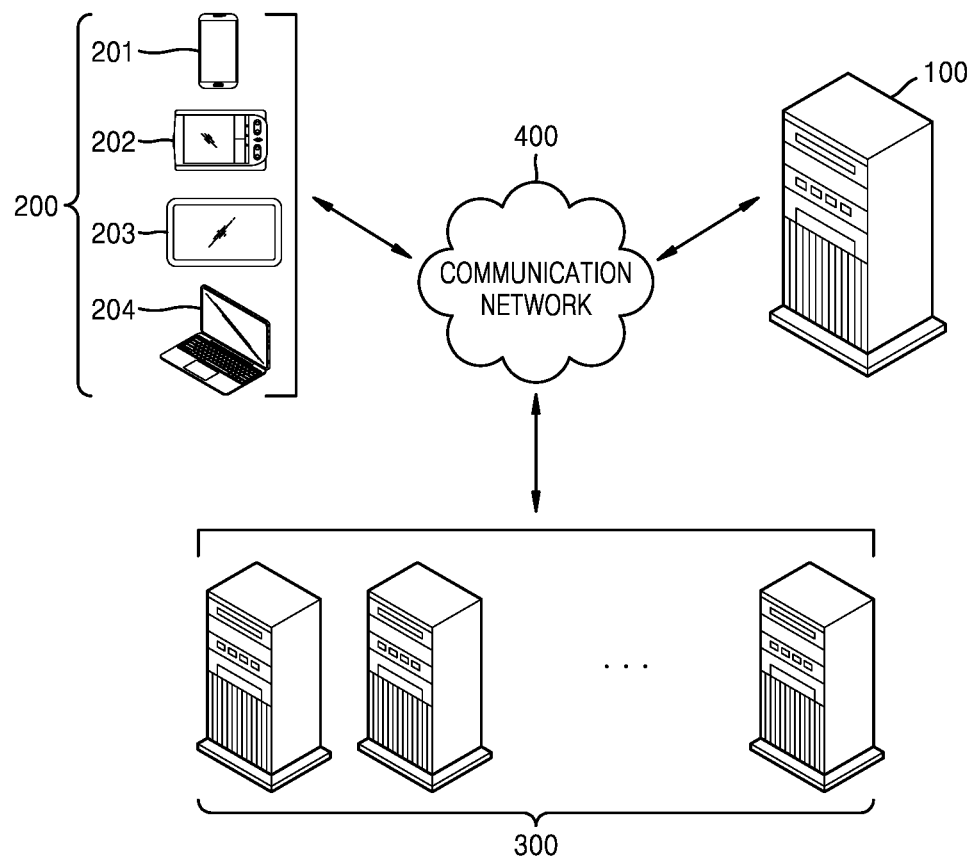
FIG. 1 is a diagram illustrating a configuration of an artificial neural network training system, according to an embodiment of the disclosure.

A method of training an artificial neural network so that a first artificial neural network trained based on a plurality of training data including a first feature and a second feature having a correlation with the first feature depends on the first feature according to an embodiment of the disclosure includes: generating first output data corresponding to first training input data, by using the first artificial neural network, wherein the first artificial neural network is a neural network trained to generate output data corresponding to the first feature from input data; generating third output data corresponding to the first output data and second training output data, by using a second artificial neural network, wherein the second artificial neural network is a neural network trained to output a result of comparison between the first output data and the second training output data, and the second training output data is data including the second feature of the first training input data; generating at least one weight correction value for training the first artificial neural network based on the third output data; and applying the at least one weight correction value to the first artificial neural network.

As the disclosure allows for various changes and numerous embodiments, certain embodiments will be illustrated in the drawings and described in the detailed description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described in detail with reference to the accompanying drawings, wherein the same or corresponding elements are denoted by the same reference numerals throughout and a repeated description thereof is omitted.

Although the terms "first," "second," etc. may be used to describe various elements, these elements should not be limited by these terms. These terms are only used to distinguish one element from another. As used herein, the singular forms "a," "an," and "the" are intended to include the plural forms as well, unless the context clearly indicates otherwise. It will be understood that the terms "including," "having," and "comprising" are intended to indicate the existence of the features or elements described in the specification, and are not intended to preclude the possibility that one or more other features or elements may exist or may be added. Sizes of components in the drawings may be exaggerated or contracted for convenience of explanation. For example, because sizes and shapes of elements in the drawings are arbitrarily illustrated for convenience of explanation, the disclosure is not limited thereto.

FIG. 1 is a diagram illustrating a configuration of an artificial neural network training system, according to an embodiment of the disclosure.

The artificial neural network training system according to an embodiment of the disclosure may train an artificial neural network so that a first artificial neural network trained based on a plurality of training data including a first feature and a second feature having a correlation with the first feature depends on the first feature. In other words, when two features included in input data depend on each other, the artificial neural network training system according to an embodiment of the disclosure may enable the artificial neural network to learn only an intended feature of the two features.

Also, the artificial neural network training system according to an embodiment of the disclosure may extract the first feature from the input data by using the artificial neural network trained according to the above process and may provide the first feature.

In the specification, the term 'artificial neural network' such as a first artificial neural network, a second artificial neural network, and a third artificial neural network is a neural network trained to be suitable for a service performed by a server 100 and/or an external device 300, and may be trained by machine learning or deep learning. A structure of a neural network will be described below with reference to FIGS. 3 and 4.

In the disclosure, the term 'feature' may refer to an individual and measurable heuristic attribute of data. For example, in the case of voice data uttered by a first speaker in a first language, 'first speaker' and 'first language' may correspond to features of the voice data. However, this is merely an example, and the spirit of the disclosure is not limited thereto.

In the disclosure, when features 'have a correlation' or 'depend on each other', it may mean that the two features are not completely independent of each other. For example, it is assumed that an apparatus for training an artificial neural network according to an embodiment of the disclosure is used in a system of determining an uttered language of a speaker. In this case, because a used language varies for each speaker in data used in training of the system, a speaker and a used language have a significant correlation. In this case, a speaker (feature) and a language (feature) may be regarded as having a correlation with each other.

The artificial neural network training system according to an embodiment of the disclosure may include the server 100, a user terminal 200, the external device 300, and a communication network 400 as shown in FIG. 1.

The user terminal 200 according to an embodiment of the disclosure may refer to any of various types of devices that mediates between a user and the server 100 and/or the external device 300 so that the user uses various services provided by the server 100 and/or the external device 300. In other words, the user terminal 200 according to an embodiment of the disclosure may refer to any of various devices that transmits/receives data to/from the server 100 and/or the external device 300.

The user terminal 200 according to an embodiment of the disclosure may be a device that transmits data whose feature is to be identified to the server 100, and receives a feature of the data (or data corresponding to the feature) from the server 100. For example, the user terminal 200 may transmit voice data whose language feature is to be identified to the server 100, and may receive language feature data of a corresponding voice from the server 100.

As such, the user terminal 200 may be any of portable terminals 201, 202, and 203, or may be a computer 204, as shown in FIG. 1.

The user terminal 200 may include a display unit for displaying content or the like to perform the above function, and an input unit for obtaining an input of the user for the content. In this case, each of the input unit and the display unit may be configured in various ways. Examples of the input unit may include, but are not limited to, a keyboard, a mouse, a trackball, a microphone, a button, and a touch panel.

The external device 300 according to an embodiment of the disclosure may refer to a device used for a service that extracts some features from original data and provides the features. For example, the external device 300 may be a device that transmits voice data whose language feature is to be identified to the server 100, receives a language feature of a corresponding voice from the server 100, and provides the language feature to various devices (e.g., a client device (not shown)). However, this is merely an example, and the use, purpose, and/or quantity of the external device 300 is not limited to the above description.

The communication network 400 according to an embodiment of the disclosure may refer to a communication network that mediates data transmission/reception between elements of the artificial neural network training system. Examples of the communication network 400 may include, but are not limited to, a wired network such as a local area network (LAN), a wide area network (WAN), a metropolitan area network (MAN), or an integrated service digital network (ISDN), and a wireless network such as a wireless LAN, code-division multiple access (CDMA), Bluetooth, or satellite communication.

The server 100 according to an embodiment of the disclosure may train an artificial neural network so that a first artificial neural network trained based on a plurality of training data including a first feature and a second feature having a correlation with the first feature depends on the first feature as described above. Also, the server 100 according to an embodiment of the disclosure may extract the first feature from input data by using the artificial neural network trained according to the above process and may provide the first feature.

Figure 2:
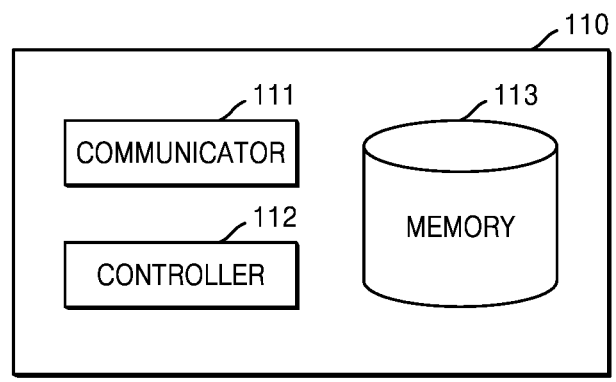
FIG. 2 is a diagram illustrating a configuration of an apparatus for training an artificial neural network provided in a server, according to an embodiment of the disclosure.

FIG. 2 is a diagram illustrating a configuration of an apparatus 110 for training an artificial neural network provided in the server 100, according to an embodiment of the disclosure.

Referring to FIG. 2, the apparatus 110 according to an embodiment of the disclosure may include a communicator 111, a controller 112, and a memory 113. Also, although not shown in FIG. 2, the apparatus 110 according to the present embodiment may further include an inputter/outputter and a program storage.

The communicator 111 may be a device including hardware and software required for the apparatus 110 to transmit/receive a signal such as a control signal or a data signal through wired/wireless connection with another network device such as the user terminal 200 and/or the external device 300.

The controller 112 may include any type of device capable of processing data such as a processor. Here, the term 'processor' may refer to, for example, a hardware-implemented data processing device having circuitry that is physically structured to execute functions represented as code or a command included in a program. Examples of the hardware-implemented data processing device may include, but are not limited to, a microprocessor, a central processing unit (CPU), a processor core, a multiprocessor, an application-specific integrated circuit (ASIC), and a field programmable gate array (FPGA).

The memory 113 temporally or permanently stores data processed by the apparatus 110. The memory may include, but is not limited to, a magnetic storage medium or a flash storage medium. For example, the memory 113 may temporarily and/or permanently store data (e.g., coefficients) constituting artificial neural networks.

The memory 113 may also store training data for training the artificial neural networks. However, this is merely an example, and the spirit of the disclosure is not limited thereto.

Figure 3:
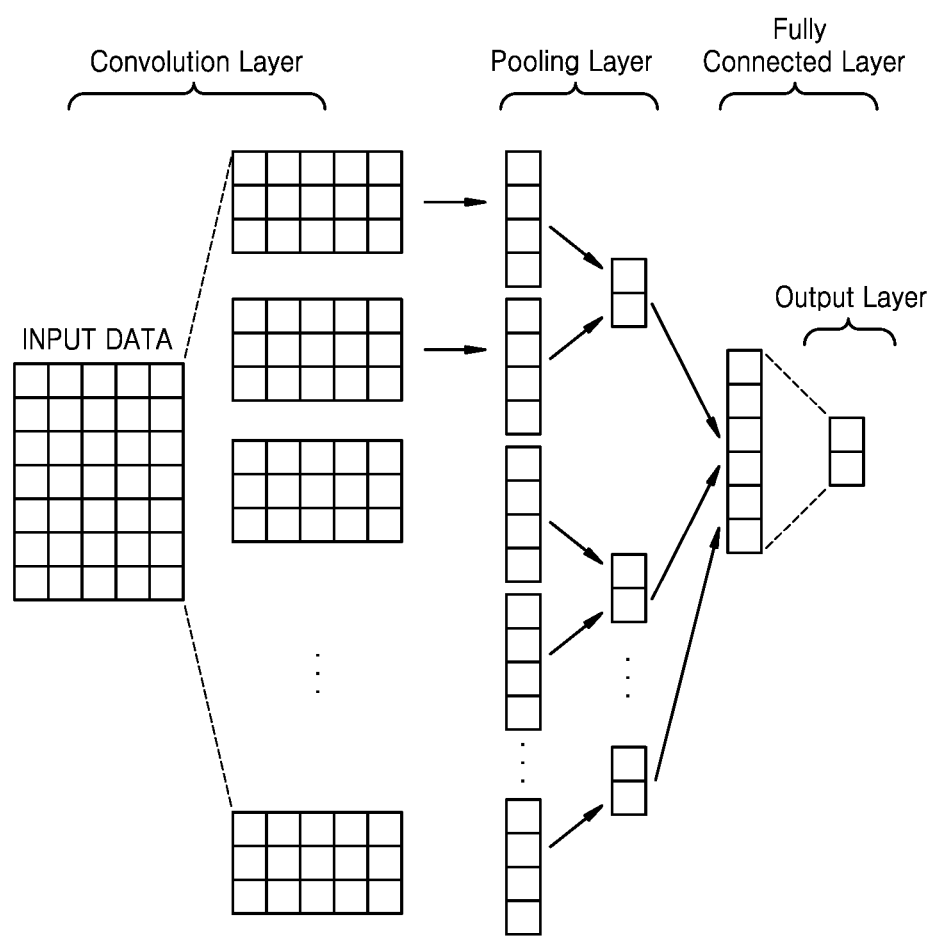
FIGS. 3 and 4 are diagrams for describing a structure of an artificial neural network trained by an apparatus for training an artificial neural network of the disclosure, where.
Figure 4:
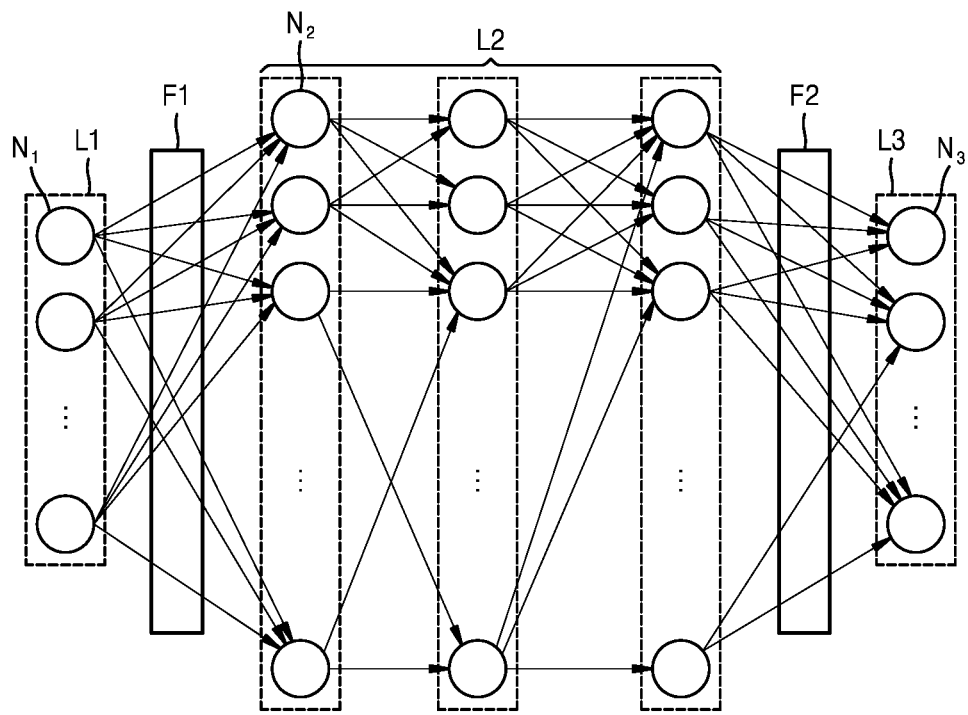

FIGS. 3 and 4 are diagrams for describing a structure of an artificial neural network trained by the apparatus 110 of the disclosure. For convenience of explanation, a first artificial neural network, a second artificial neural network, and a third artificial neural network are collectively referred to as 'artificial neural networks'.

An artificial neural network according to an embodiment of the disclosure may be an artificial neural network according to a convolutional neural network (CNN) model as shown in FIG. 3. In this case, the CNN model may be a hierarchical model used to finally extract a feature of input data by alternately performing a plurality of computational layers (a convolutional layer and a pooling layer).

The controller 112 according to an embodiment of the disclosure may build or train an artificial neural network model by processing training data according to supervised learning. A method in which the controller 112 trains an artificial neural network will be described below in detail.

The controller 112 according to an embodiment of the disclosure may train, by using a plurality of training data, an artificial neural network by repeatedly performing a process of refining a weight of each layer and/or each node so that an output value generated by inputting one input data to the artificial neural network approaches a value labeled in the corresponding training data. In this case, the controller 112 according to an embodiment of the disclosure may refine a weight (or a coefficient) of each layer and/or each node according to a back propagation algorithm.

The controller 112 according to an embodiment of the disclosure may generate a convolution layer for extracting feature values of input data and a pooling layer for configuring feature maps by combining the extracting feature values.

Also, the controller 112 according to an embodiment of the disclosure may combine the generated feature maps, to generate a fully connected layer that prepares to determine a probability that the input data corresponds to each of a plurality of items.

The controller 112 according to an embodiment of the disclosure may calculate an output layer including an output corresponding to the input data.

Although input data is divided into 5×7 blocks, a 5×3 unit block is used to generate a convolution layer, and a 1×4 or 1×2 unit block is used to generate a pooling layer in FIG. 3, this is merely an example and the spirit of the disclosure is not limited thereto. Accordingly, a type of input data and/or a size of each block may be determined in various ways.

Such an artificial neural network may be stored in the memory 113 as coefficients of at least one node constituting the artificial neural network, a weight of the node, and coefficients of a function defining a relationship between a plurality of layers included in the artificial neural network. A structure of the artificial neural network may also be stored as a source code and/or a program in the memory 113.

The artificial neural network according to an embodiment of the disclosure may be an artificial neural network according to a recurrent neural network (RNN) model as shown in FIG. 4.

Referring to FIG. 4, the artificial neural network according to an RNN model may include an input layer L1 including at least one input node $N_1$, a hidden layer L2 including a plurality of hidden nodes $N_2$, and an output layer L3 including at least one output node $N_3$. In this case, input data including two or more features may be input to at least one input node $N_1$ of the input layer L1.

The hidden layer L2 may include one or more fully connected layers as shown in FIG. 4. When the hidden layer L2 includes a plurality of layers, the artificial neural network may include a function (not shown) that defines a relationship between hidden layers.

At least one output node $N_3$ of the output layer L3 may include an output value generated by the artificial neural network from an input value of the input layer L1 under the control of the controller 112. For example, the output layer L3 may include a value corresponding to a first feature of the input data. However, this is merely an example, and the spirit of the disclosure is not limited thereto.

A value included in each node of each layer may be a vector. Also, each node may include a weight corresponding to the importance of the node.

The artificial neural network may include a first function F1 that defines a relationship between the input layer L1 and the hidden layer L2, and a second function F2 that defines a relationship between the hidden layer L2 and the output layer L3.

The first function F1 may define a connection relationship between the input node $N_1$ included in the input layer L1 and the hidden node $N_2$ included in the hidden layer L2. Likewise, the second function F2 may define a connection relationship between the hidden node $N_2$ included in the hidden layer L2 and the output node $N_3$ included in the output layer L3.

The first function F1, the second function F2, and functions between the hidden layers may include an RNN model that outputs a result based on an input of a previous node.

While the artificial neural network is trained by the controller 112, the artificial neural network may be trained as to the first function F1 and the second function F2 based on a plurality of training data. While the artificial neural network is trained, the artificial neural network may also be trained as to functions between the plurality of hidden layers in addition to the first function F1 and the second function F2.

The artificial neural network according to an embodiment of the disclosure may be trained by using supervised learning based on labeled training data.

The controller 112 according to an embodiment of the disclosure may train, by using a plurality of training data, an artificial neural network by repeatedly performing a process of refining the above functions (e.g., F1, F2, and the functions between the hidden layers) so that an output value generated by inputting one input data to the artificial neural network approaches a value labeled in the training data.

In this case, the controller 112 according to an embodiment of the disclosure may refine the above functions (e.g., F1, F2, and the functions between the hidden layers) according to a back propagation algorithm. However, this is merely an example, and the spirit of the disclosure is not limited thereto.

Types and/or structures of artificial neural networks described with reference to FIGS. 3 and 4 are merely examples, and the spirit of the disclosure is not limited thereto. Accordingly, an artificial neural network of any of various types of models may correspond to the 'artificial neural network' described in the specification.

A method of training an artificial neural network will now be described.

Figure 5:
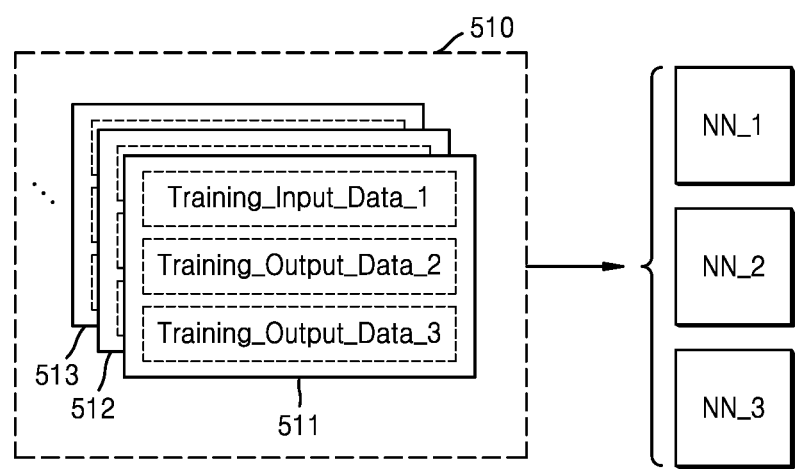
FIG. 5 is a diagram illustrating a configuration of a plurality of training data.
Figure 6:
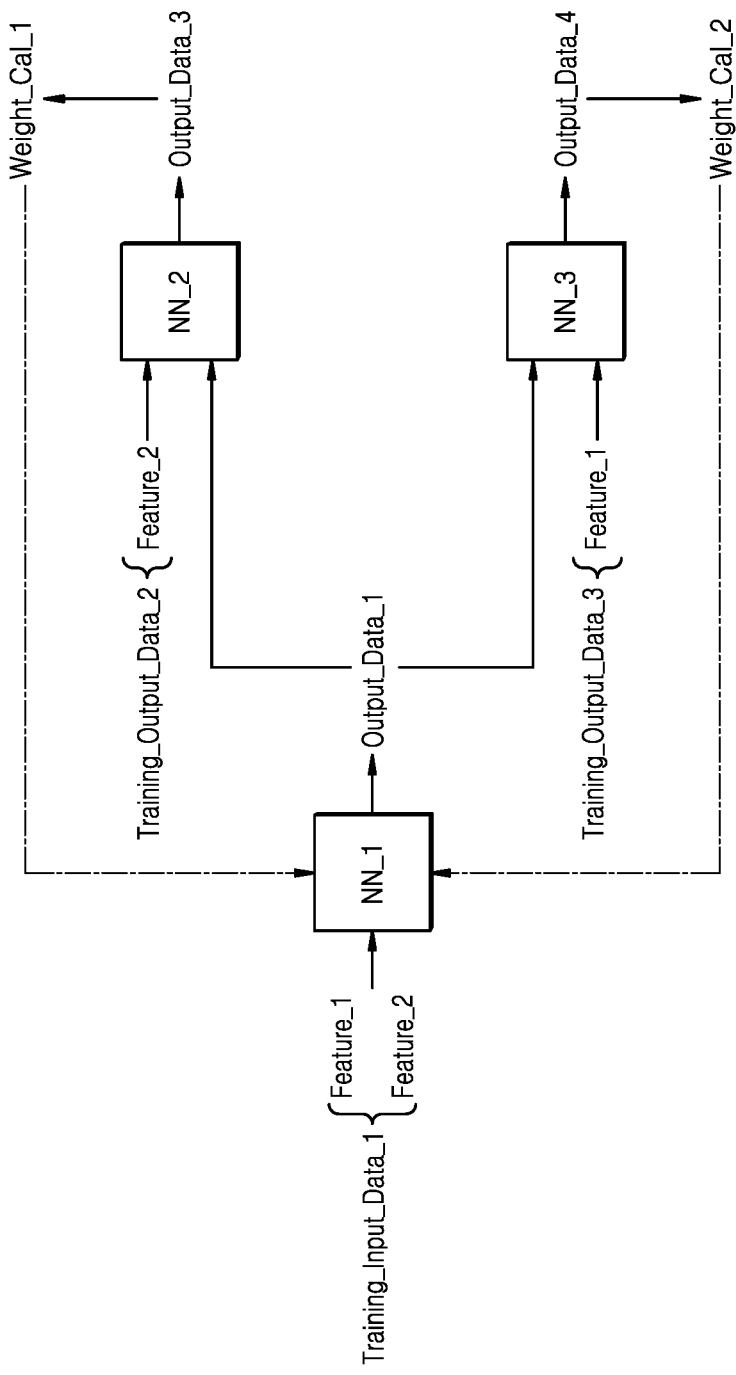
FIG. 6 is a diagram for describing a process in which an apparatus for training an artificial neural network trains artificial neural networks by using a plurality of training data, according to an embodiment of the disclosure.

FIG. 5 is a diagram illustrating a configuration of a plurality of training data 510. FIG. 6 is a diagram for describing a process in which the apparatus 110 trains a plurality of artificial neural networks, e.g., first through third artificial neural networks NN_1, NN_2, and NN_3, by using the plurality of training data 510, according to an embodiment of the disclosure. The following will be described with reference to FIGS. 5 and 6 together.

The apparatus 110 according to an embodiment of the disclosure may generate first output data Output_Data_1 corresponding to first training input data Training_Input_Data_1 by using the first artificial neural network NN_1.

In the disclosure, the term 'first artificial neural network NN_1' may refer to a neural network that is trained to generate output data corresponding to a first feature Feature_1 from input data. For example, when the input data is voice data including a speaker feature and a language feature, the first artificial neural network NN_1 may be a neural network trained to generate output data corresponding only to the language feature in the voice data. However, this is merely an example, and the spirit of the disclosure is not limited thereto.

In the disclosure, the plurality of training data 510 may include one or more individual training data 511, 512, and 513 as shown in FIG. 5. In this case, the individual training data 511, 512, and 513 may include the first training input data Training_Input_Data_1, second training output data Training_Output_Data_2, and third training output data Training_Output_Data_3.

In an embodiment of the disclosure, the first training input data Training_Input_Data_1 may be data including both the first feature Feature_1 and a second feature Feature_2, and may be input to the first artificial neural network NN_1 for training. The second training output data Training_Output_Data_2 may be data including only the second feature Feature_2 of the first training input data Training_Input_Data_1. Also, the third training output data Training_Output_Data_3 may be data including only the first feature Feature_1 of the first training input data Training_Input_Data_1.

For example, when the first training input data Training_Input_Data_1 is voice data including a language feature as the first feature Feature_1 and including a speaker feature as the second feature Feature_2, the second training output data Training_Output_Data_2 may be data including only the speaker feature of the first training input data Training_Input_Data_1, and the third training output data Training_Output_Data_3 may be data including only the language feature of the first training input data Training_Input_Data_1. However, this is merely an example, and the spirit of the disclosure is not limited thereto.

The first output data Output_Data_1 output by the first artificial neural network NN_1 may include both the first feature Feature_1 and the second feature Feature_2, or may include only the first feature Feature_1, according to a degree of training of the first artificial neural network NN_1. In this case, when 'only the first feature Feature_1 is included', it may include not only a case where the second feature Feature_2 is not included at all, but also a case where the second feature Feature_2 is hardly included to the extent that it is difficult to consider that the second feature Feature_2 is included.

The apparatus 110 according to an embodiment of the disclosure may generate third output data Output_Data_3 corresponding to the first output data Output_Data_1 and the second training output data Training_Output_Data_2, by using the second artificial neural network NN_2.

In this case, the second artificial neural network NN_2 may be a neural network trained to output a result of comparison between the first output data Output_Data_1 and the second training output data Training_Output_Data_2.

As described above, the second training output data Training_Output_Data_2 may be data including only the second feature Feature_2 of the first training input data Training_Input_Data_1.

Accordingly, the apparatus 110 according to an embodiment of the disclosure may generate the third output data Output_Data_3 by evaluating how much the second feature Feature_2 of the first training input data Training_Input_Data_1 is reflected in the first output data Output_Data_1 by using the second artificial neural network NN_2.

The apparatus 110 according to an embodiment of the disclosure may generate at least one weight correction value Weight_Cal_1 for training the first artificial neural network NN_1, based on the third output data Output_Data_3 generated according to the above process. For example, the apparatus 110 according to an embodiment of the disclosure may generate the at least one weight correction value Weight_Cal_1 by using a method in which at least one parameter related to the second artificial neural network NN_2 generated according to an input of the first training input data Training_Input_Data_1 becomes a value changed according to a certain method.

In this case, the 'certain method' may be a method in which at least one gradient value of the second artificial neural network NN_2 generated according to an input of the first training input data Training_Input_Data_1 becomes a value with the same absolute value and the opposite sign.

Also, the 'certain method' may be a method in which a certain scale factor is applied to at least one gradient value of the second artificial neural network NN_2 generated according to an input of the first training input data Training_Input_Data_1. In this case, the 'scale factor' may be a value for adjusting at least one of a magnitude and a sign of the at least one gradient value.

The apparatus 110 according to an embodiment of the disclosure may apply the at least one weight correction value Weight_Cal_1 generated according to the above process to the first artificial neural network NN_1. For example, the apparatus 110 may apply the at least one weight correction value Weight_Cal_1 to at least one parameter constituting the first artificial neural network NN_1.

As such, according to the disclosure, the second feature Feature_2 of the first training input data Training_Input_Data_1 may be excluded (or reduced) from the first output data Output_Data_1.

The apparatus 110 according to an embodiment of the disclosure may perform a process similar to the above process by using the third training output data Training_Output_Data_3 and the third artificial neural network NN_3.

In more detail, the apparatus 110 according to an embodiment of the disclosure may generate fourth output data Output_Data_4 corresponding to the first output data Output_Data_1 and the third training output data Training_Output_Data_3, by using the third artificial neural network NN_3.

In this case, the third artificial neural network NN_3 may be a neural network trained to output a result of comparison between the first output data Output_Data_1 and the third training output data Training_Output_Data_3.

As described above, the third training output data Training_Output_Data_3 may be data including only the first feature Feature_1 of the first training input data Training_Input_Data_1.

Accordingly, the apparatus 110 according to an embodiment of the disclosure may generate THE fourth output data Output_Data_4 by evaluating how much the first feature Feature_1 of the first training input data Training_Input_Data_1 is reflected in the first output data Output_Data_1 by using the third artificial neural network NN_3.

The apparatus 110 according to an embodiment of the disclosure may generate at least one weight correction value Weight_Cal_2 for training the first artificial neural network NN_1, based on the fourth output data Output_Data_4 generated according to the above process. For example, the apparatus 110 according to an embodiment of the disclosure may generate at least one weight correction value Weight_Cal_2 by using a method in which at least one parameter related to the third artificial neural network NN_3 generated according to an input of the first training input data Training_Input_Data_1 becomes a value changed according to a certain method.

In this case, the 'certain method' may be a method in which a certain scale factor is applied to at least one gradient value of the third artificial neural network NN_3 generated according to an input of the first training input data Training_Input_Data_1. In this case, the 'scale factor' may be a value for adjusting at least one of a magnitude and a sign of the at least one gradient value.

The apparatus 110 according to an embodiment of the disclosure may apply the at least one weight correction value Weight_Cal_2 generated according to the above process to the first artificial neural network NN_1. For example, the apparatus 110 may apply the at least one weight correction value Weight_Cal_2 to at least one parameter constituting the first artificial neural network NN_1.

As such, according to the disclosure, the first feature Feature_1 of the first training input data Training_Input_Data_1 may be reinforced in the first output data Output_Data_1, and even when the first feature Feature_1 and the second feature Feature_2 having a correlation with the first feature Feature_1 included in input data, an artificial neural network may generate output data by depending only on the first feature Feature_1.

Figures 7, 8:
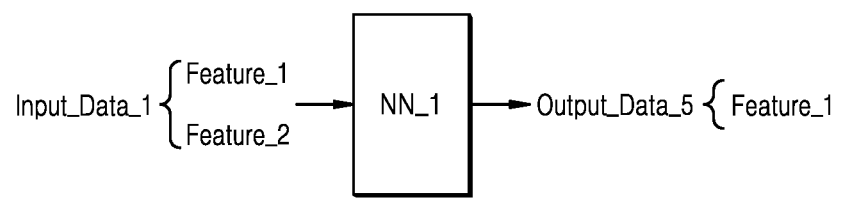
FIG. 7 is a diagram for describing a process in which an apparatus for training an artificial neural network generates fifth output data from first input data.
FIG. 8 is a diagram for describing training data.

FIG. 7 is a diagram for describing a process in which the apparatus 110 generates fifth output data Output_Data_5 from first input data Input_Data_1. For convenience of explanation, it is assumed that the first artificial neural network NN_1 is trained according to the process described with reference to FIGS. 5 and 6.

The apparatus 110 according to an embodiment of the disclosure may generate the fifth output data Output_Data_5 from the first input data Input_Data_1 by using the trained first artificial neural network NN_1. In this case, the first input data Input_Data_1 may be data including a first feature Feature_1 and a second feature Feature_2, and the fifth output data Output_Data_5 may be data including only the first feature Feature_1 or hardly including the second feature Feature_2.

Accordingly, according to the disclosure, output data depending only on the first feature Feature_1 may be generated from input data including the first feature Feature_1 and the second feature Feature_2 having a correlation with the first feature Feature_1.

Figure 9:
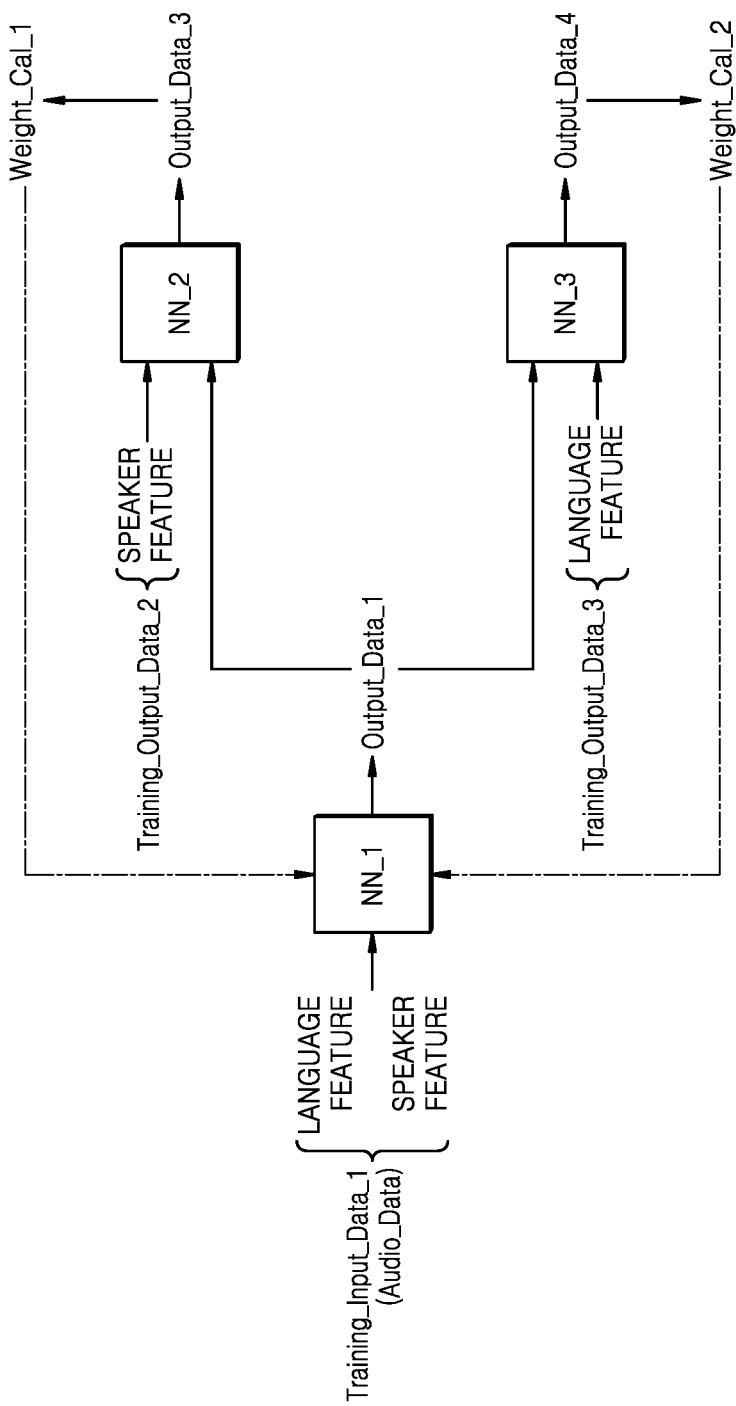
FIG. 9 is a diagram for describing a process in which an apparatus for training an artificial neural network trains artificial neural networks by using training data of FIG. 8, according to an embodiment of the disclosure.
Figure 10:
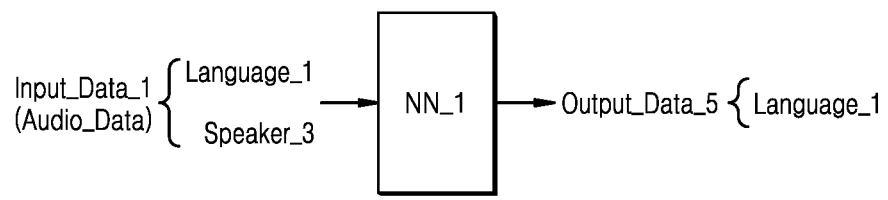
FIG. 10 is a diagram for describing a process in which an apparatus for training an artificial neural network generates fifth output data from first input data by using a first artificial neural network.

FIGS. 8 through 10 are diagrams for describing an example in which the apparatus 110 is used in a voice processing system, according to an embodiment of the disclosure.

FIG. 8 is a diagram for describing training data. FIG. 9 is a diagram for describing a process in which the apparatus 110 trains artificial neural networks, e.g., first through third artificial neural networks NN_1, NN_2, and NN_3, by using training data of FIG. 8, according to an embodiment of the disclosure. FIG. 10 is a diagram for describing a process in which the apparatus 110 generates fifth output data Output_Data_5 from first input data Input_Data_1 by using the first artificial neural network NN_1. The following will be described with reference to FIGS. 8 through 10 together.

A voice processing system according to an embodiment of the disclosure may determine a type of a language of an input voice. For example, the voice processing system may determine whether the language of the input voice is Korean or English. In this case, the voice processing system may output a probability that the voice corresponds to each language.

The apparatus 110 according to an embodiment of the disclosure may be used in the voice processing system. To this end, the apparatus 110 may train the first through third artificial neural networks NN_1, NN_2, and NN_3 based on training data of FIG. 8.

Referring to FIG. 8, individual training data may include data about a first feature Feature_1 and data about a second feature Feature_2.

For example, first training data may include uttered voice data Audio_Data_1 of a first language of a first speaker as first training input data, a feature (i.e., a Korean language feature) of the first language that is a language feature of the voice data Audio_Data_1 as third training output data Training_Output_Data_3, and a feature (i.e., a first speaker feature) of the first speaker that is a speaker feature of the voice data Audio_Data_1 as second training output data Training_Output_Data_2.

The apparatus 110 according to an embodiment of the disclosure may generate first output data Output_Data_1 corresponding to the first training input data Training_Input_Data_1 by using the first artificial neural network NN_1. For example, the apparatus 110 may generate the first output data Output_Data_1 corresponding to an input of the voice data Audio_Data. In this case, the input voice data may be voice data including both a language feature and a speaker feature. Also, the first output data Output_Data_1 may include a speaker feature a lot or a little according to a degree of training of the first artificial neural network NN_1. The first output data Output_Data_1 may include a language feature as intended.

The apparatus 110 may generate third output data Output_Data_3 corresponding to the first output data Output_Data_1 and the second training output data Training_Output_Data_2, by using the second artificial neural network NN_2.

In this case, the second artificial neural network NN_2 may be a neural network trained to output a result of comparison between the first output data Output_Data_1 and the second training output data Training_Output_Data_2.

As described above, the second training output data Training_Output_Data_2 may be data including only the second feature of the first training input data Training_Input_Data_1. That is, the second training output data Training_Output_Data_2 may be data including only a speaker feature of the voice data that is input data.

Accordingly, the apparatus 110 may generate the third output data Output_Data_3 by evaluating how much the speaker feature is reflected in the first output data Output_Data_1 by using the second artificial neural network NN_2.

The apparatus 110 may generate at least one weight correction value Weight_Cal_1 for training the first artificial neural network NN_1, based on the third output data Output_Data_3 generated according to the above process. In this case, the generated weight correction value Weight_Cal_1 may be a value for correcting at least one weight constituting the first artificial neural network to less reflect the speaker feature in the first output data Output_Data_1.

The apparatus 110 according to an embodiment of the disclosure may apply the at least one weight correction value Weight_Cal_1 generated according to the above process to the first artificial neural network NN_1. For example, the apparatus 110 may apply the at least weight correction value Weight_Cal_1 to at least one parameter constituting the first artificial neural network NN_1.

Accordingly, according to the disclosure, the speaker feature may be excluded (or reduced) from the first output data Output_Data_1.

The apparatus 110 according to an embodiment of the disclosure may perform a process similar to the above process by using the language feature and the third artificial neural network NN_3.

In more detail, the apparatus 110 according to an embodiment of the disclosure may generate fourth output data Output_Data_4 corresponding to the first output data Output_Data_4 and the third training output data Training_Output_Data_3, by using the third artificial neural network NN_3.

In this case, the third artificial neural network NN_3 may be a neural network trained to output a result of comparison between the first output data Output_Data_1 and the third training output data Training_Output_Data_3.

As described above, the third training output data Training_Output_Data_3 may be data including only the first feature of the first training input data Training_Input_Data_1. That is, the third training output data Training_Output_Data_3 may be data including only the language feature of the voice data that is input data.

Accordingly, the apparatus 110 according to an embodiment of the disclosure may generate the fourth output data Output_Data_4 by evaluating how much the language feature is reflected in the first output data Output_Data_1 by using the third artificial neural network NN_3.

The apparatus 110 according to an embodiment of the disclosure may generate at least one weight correction value Weight_Cal_2 for training the first artificial neural network NN_1, based on the fourth output data Output_Data_4 generated according to the above process. In this case, the generated weight correction value Weight_Cal_2 may be a value for correcting at least one weight constituting the first artificial neural network NN_1 to more reflect the language feature in the first output data Output_Data_1.

The apparatus 110 according to an embodiment of the disclosure may apply the at least one weight correction value Weight_Cal_2 generated according to the above process to the first artificial neural network NN_1. For example, the apparatus 110 may apply the at least one weight correction value Weight_Cal_2 to at least one parameter constituting the first artificial neural network NN_1.

As such, according to the disclosure, the language feature may be more reinforced in the first output data Output_Data_1, and even when a language feature and a speaker feature related to the language feature are included in input data, an artificial neural network may generate output data by depending on the language feature.

FIG. 10 is a diagram for describing a process in which the apparatus 110 generates the fifth output data Output_Data_5 from the first input data Input_Data_1 by using the first artificial neural network NN_1. For convenience of explanation, it is assumed that the first artificial neural network NN_1 is trained according to a process described with reference to FIGS. 8 through 9.

The apparatus 110 according to an embodiment of the disclosure may generate the fifth output data Output_Data_5 from the first input data Input_Data_1 by using the trained first artificial neural network NN_1. In this case, the first input data Input_Data_1 may be voice data including a language feature Language_1 and a speaker feature Speaker_3, and the fifth output data Output_Data_5 may be data including only the language feature Language_1 or hardly including the speaker feature Speaker_3.

Accordingly, according to the disclosure, output data depending only on the language feature Language_1 may be generated from the voice data including the language feature Language_1 and the speaker feature Speaker_3 having a correlation with the language feature Language_1.

The apparatus 110 according to an embodiment of the disclosure may evaluate a pronunciation of input voice data, by using the first through third artificial neural networks NN_1, NN_2, and NN_3 trained according to the above process. For example, the apparatus 110 may evaluate that as a probability that input voice data is a specific language increases, the accuracy of a pronunciation of the specific language increases, by referring to the fifth output data Output_Data_5. However, this is merely an example, and the spirit of the disclosure is not limited thereto.

Figure 11:
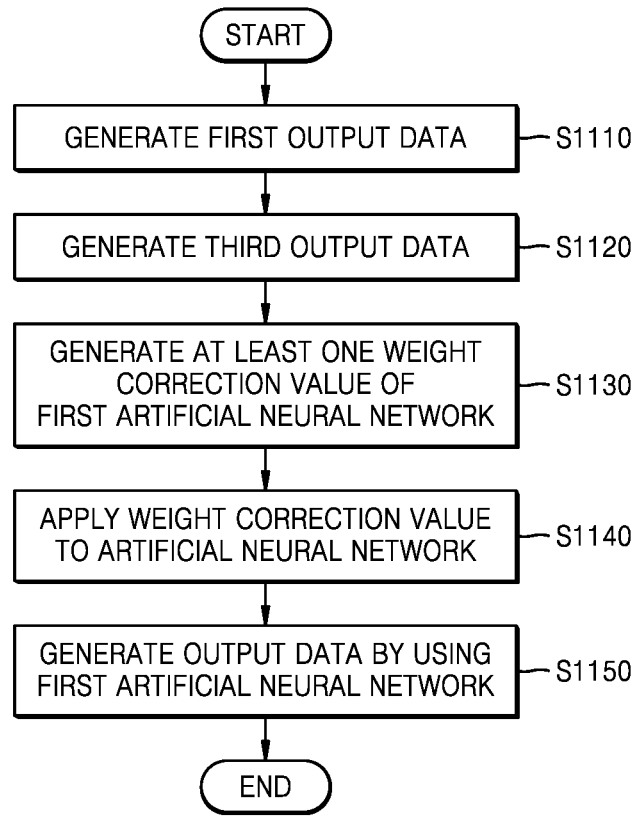
FIG. 11 is a flowchart for describing a method of training an artificial neural network performed by an apparatus for training an artificial neural network, according to an embodiment of the disclosure.

FIG. 11 is a flowchart for describing a method of training an artificial neural network performed by the apparatus 110, according to an embodiment of the disclosure. The same description as that made with reference to FIGS. 1 through 10 will be omitted.

The apparatus 110 according to an embodiment of the disclosure may generate the first output data Output_Data_1 corresponding to the first training input data Training_Input_Data_1 by using the first artificial neural network NN_1 (S1110).

FIG. 5 is a diagram illustrating a configuration of the plurality of training data 510. FIG. 6 is a diagram for describing a process in which the apparatus 110 trains the first through third artificial neural networks NN_1, NN_2, and NN_3 by using the plurality of training data 510, according to an embodiment of the disclosure. The following will be described with reference to FIGS. 5 and 6 together.

In the disclosure, the term 'first artificial neural network NN_1' may refer to a neural network trained to generate output data corresponding to the first feature Feature_1 from input data. For example, when the input data is voice data including a speaker feature and a language feature, the first artificial neural network NN_1 may be a neural network trained to generate output data corresponding only to the language feature in the voice data. However, this is merely an example, and the spirit of the disclosure is not limited thereto.

In the disclosure, the plurality of training data 510 may include one or more individual training data 511, 512, and 513 as shown in FIG. 5. In this case, the individual training data 511, 512, and 513 may include the first training input data Training_Input_Data_1, the second training output data Training_Output_Data_2, and the third training output data Training_Output_Data_3.

In an embodiment of the disclosure, the first training input data Training_Input_Data_1 may be data including both the first feature Feature_1 and the second feature Feature_2, and may be input to the first artificial neural network NN_1 for training. The second training output data Training_Output_Data_2 may be data including only the second feature Feature_2 of the first training input data Training_Input_Data_1. Also, the third training output data Training_Output_Data_3 may be data including only the first feature Feature_1 of the first training input data Training_Input_Data_1.

For example, when the first training input data Training_Input_Data_1 is voice data including a language feature as the first feature Feature_1 and including a speaker feature as the second feature Feature_2, the second training output data Training_Output_Data_2 may be data including only the speaker feature of the first training input data Training_Input_Data_1, and the third training output data Training_Output_Data_3 may be data including only the language feature of the first training input data Training_Input_Data_1. However, this is merely an example, and the spirit of the disclosure is not limited thereto.

The first output data Output_Data_1 output by the first artificial neural network NN_1 may include both the first feature Feature_1 and the second feature Feature_2, or may include only the first feature Feature_1, according to a degree of training of the first artificial neural network NN_1. In this case, when 'only the first feature Feature_1 is included', it may include not only a case where the second feature Feature_2 is not included at all, but also a case where the second feature Feature_2 is hardly included to the extent that it is difficult to consider that the second feature Feature_2 is included.

The apparatus 110 according to an embodiment of the disclosure may generate the third output data Output_Data_3 corresponding to the first output data Output_Data_1 and the second training output data Training_Output_Data_2, by using the second artificial neural network NN_2 (S1120).

In this case, the second artificial neural network NN_2 may be a neural network trained to output a result of comparison between the first output data Output_Data_1 and the second training output data Training_Output_Data_2.

As described above, the second training output data Training_Output_Data_2 may be data including only the second feature Feature_2 of the first training input data Training_Input_Data_1.

Accordingly, the apparatus 110 according to an embodiment of the disclosure may generate the third output data Output_Data_3 by evaluating how much the second feature Feature_2 of the first training input data Training_Input_Data_1 is reflected in the first output data Output_Data_1 by using the second artificial neural network NN_2.

The apparatus 110 according to an embodiment of the disclosure may generate at least one weight correction value Weight_Cal_1 for training the first artificial neural network NN_1, based on the third output data Output_Data_3 generated according to the above process (S1130).

For example, the apparatus 110 according to an embodiment of the disclosure may generate the at least one weight correction value Weight_Cal_1 by using a method in which at least one parameter related to the second artificial neural network NN_2 generated according to an input of the first training input data Training_Input_Data_1 becomes a value changed according to a certain method.

In this case, the 'certain method' may be a method in which at least one gradient value of the second artificial neural network NN_2 generated according to an input of the first training input data Training_Input_Data_1 becomes a value with the same absolute value and the opposite sign.

Also, the 'certain method' may be a method in which a certain scale factor is applied to at least one gradient value of the second artificial neural network NN_2 generated according to an input of the first training input data Training_Input_Data_1. In this case, the 'scale factor' may be a value for adjusting at least one of a magnitude and a sign of the at least one gradient value.

The apparatus 110 according to an embodiment of the disclosure may apply the at least one weight correction value Weight_Cal_1 generated according to the above process to the first artificial neural network NN_1 (S1140). For example, the apparatus 110 may apply the at least one weight correction value Weight_Cal_1 to at least one parameter constituting the first artificial neural network NN_1.

As such, according to the disclosure, the second feature Feature_2 of the first training input data Training_Input_Data_1 may be excluded (or reduced) from the first output data Output_Data_1.

The apparatus 110 according to an embodiment of the disclosure may perform a process similar to the above process by using the third training output data Training_Output_Data_3 and the third artificial neural network NN_3 (S1120 through S1140).

In more detail, the apparatus 110 according to an embodiment of the disclosure may generate the fourth output data Output_Data_4 corresponding to the first output data Output_Data_1 and the third training output data Training_Output_Data_3, by using the third artificial neural network NN_3.

In this case, the third artificial neural network NN_3 may be a neural network trained to output a result of comparison between the first output data Output_Data_1 and the third training output data Training_Output_Data_3.

As described above, the third training output data Training_Output_Data_3 may be data including only the first feature Feature_1 of the first training input data Training_Input_Data_1.

Accordingly, the apparatus 110 according to an embodiment of the disclosure may generate the fourth output data Output_Data_4 by evaluating how much the first feature Feature_1 of the first training input data Training_Input_Data_1 is reflected in the first output data Output_Data_1 by using the third artificial neural network NN_3.

The apparatus 110 according to an embodiment of the disclosure may generate at least one weight correction value Weight_Cal_2 for training the first artificial neural network NN_1, based on the fourth output data Output_Data_4 generated according to the above process. For example, the apparatus 110 according to an embodiment of the disclosure may generate the at least one weight correction value Weight_Cal_2 by using a method in which at least one parameter related to the third artificial neural network NN_3 generated according to an input of the first training input data Training_Input_Data_1 becomes a value changed according to a certain method.

In this case, the 'certain method' may be a method in which a certain scale factor is applied to at least one gradient value of the third artificial neural network NN_3 generated according to an input of the first training input data Training_Input_Data_1. In this case, the 'scale factor' may be a value for adjusting at least one of a magnitude and a sign of the at least one gradient value.

The apparatus 110 according to an embodiment of the disclosure may apply the at least one weight correction value Weight_Cal_2 generated according to the above process to the first artificial neural network NN_1. For example, the apparatus 110 may apply the at least one weight correction value Weight_Cal_2 to at least one parameter constituting the first artificial neural network NN_1.

As such, according to the disclosure, the first feature Feature_1 of the first training input data Training_Input_Data_1 may be reinforced in the first output data Output_Data_1, and even when the first feature Feature_1 and the second feature Feature_2 having a correlation with the first feature Feature_1 are included in input data, an artificial neural network may generate output data by depending only on the first feature Feature_1.

FIG. 7 is a diagram for describing a process in which the apparatus 110 generates the fifth output data Output_Data_5 from the first input data Input_Data_1. For convenience of explanation, it is assumed that the first artificial neural network NN_1 is trained according to the process described with reference to FIGS. 5 and 6.

The apparatus 110 according to an embodiment of the disclosure may generate the fifth output data Output_Data_5 from the first input data Input_Data_1 by using the first artificial neural network NN_1 (S1150).

In this case, the first input data Input_Data_1 may be data including the first feature Feature_1 and the second feature Feature_2, and the fifth output data Output_Data_5 may be data including only the first feature Feature_1 or hardly including the second feature Feature_2.

Accordingly, according to the disclosure, output data depending only on the first feature Feature_1 may be generated from input data including the first feature Feature_1 and the second feature Feature_2 having a correlation with the first feature Feature_1.

Meanwhile, the embodiments of the disclosure may be implemented as computer programs executable through various components on a computer, and the computer programs may be stored in a computer-readable medium. In this case, the medium may store computer-executable programs. Examples of the medium may include magnetic media such as a hard disk, a floppy disk, and a magnetic tape, optical recording media such as a compact disc read-only memory (CD-ROM) and a digital versatile disc (DVD), magneto-optical media such as a floptical disk, and devices configured to store program instructions such as a ROM, a random-access memory (RAM), and a flash memory.

The computer programs may be specially designed and configured for the disclosure or may be well-known to and be usable by one of ordinary skill in the art of computer software. Examples of the program programs may include advanced language codes that may be executed by a computer by using an interpreter or the like as well as machine language codes made by a compiler.

Specific execution methods described in the disclosure are examples, and the scope of the disclosure is not limited by any method. For the sake of brevity, conventional electronics, control systems, software, and other functional aspects of the systems may not be described in detail. Also, lines or members connecting elements illustrated in the drawings are merely illustrative of functional connections and/or physical or circuit connections. In an actual device, the connections between elements may be represented by various functional connections, physical connections, or circuit connections that are replaceable or added. Moreover, no item or component is essential to the practice of the disclosure unless the item or component is specifically described as "essential" or "critical".

Accordingly, the spirit of the disclosure is not limited to the above-described embodiments, and all ranges equivalent to the claims or equivalently changed therefrom as well as the claims described below belong to the scope of the spirit of the disclosure.

The invention claimed is:

1. A method of training an artificial neural network, the method comprising: generating first output data corresponding to first training input data, by using a first artificial neural network, wherein the first artificial neural network is trained based on a plurality of training data comprising a first feature and a second feature that has a correlation with the first feature and depends on the first feature; and the first artificial neural network is a neural network trained to generate output data corresponding to the first feature from input data; generating third output data corresponding to the first output data and second training output data, by using a second artificial neural network, wherein the second artificial neural network is a neural network trained to output a result of comparison between the first output data and the second training output data, and the second training output data includes data comprising the second feature of the first training input data; generating at least one weight correction value for training the first artificial neural network based on the third output data; and applying the at least one weight correction value to the first artificial neural network, wherein the least one weight correction value is determined by a method in which a scale factor applied to at least one gradient value.

2. The method of claim 1, further comprising after generating the first output data, generating fourth output data corresponding to the first output data and third training output data, by using a third artificial neural network, wherein the third artificial neural network is a neural network trained to output a result of comparison between the first output data and the third training output data, and the third training output data includes data comprising the first feature of the first training input data.

3. The method of claim 1, further comprising: generating each of the plurality of training data including: the first training input data, third training output data comprising the first feature of the first training input data, and the second training output data comprising the second feature of the first training input data.

4. The method of claim 3, further comprising: generating first training data from among the plurality of training data including: uttered voice data of a first language of a first speaker as the first training input data, data comprising a feature of the first language as the third training output data, and data comprising a feature of the first speaker as the second training output data, and generating second training data from among the plurality of training data including: uttered voice data of a second language of a second speaker as the first training input data, data comprising a feature of the second language as the third training output data, and data comprising a feature of the second speaker as the second training output data.

5. The method of claim 4, wherein: generating the first output data further comprises outputting the first output data from the uttered voice data of the first language of the first speaker, generating the third output data further comprises generating the third output data that is a result of comparison between the first output data and the second training output data comprising the feature of the first speaker, and generating the at least one weight correction value further comprises, by referring to the third output data, generating the at least one weight correction value for reducing the feature of the first speaker, from the first output data.

6. The method of claim 4, wherein: generating the first output data further comprises generating the first output data from the uttered voice data of the second language of the second speaker, generating the third output data further comprises generating the third output data that is a result of comparison between the first output data and the second training output data comprising the feature of the second speaker, and generating the at least one weight correction value further comprises, by referring to the third output data, generating the at least one weight correction value for reducing the feature of the second speaker, from the first output data.

7. The method of claim 1, further comprising, after the generating of the first output data, generating the first output data depending on a feature of a first language, from input data comprising uttered voice data of the first language of a third speaker, by using the first artificial neural network.

\* \* \* \* \*